No. 780,798. PATENTED JAN. 24, 1905.
ARBA HOLMES & ALBERT HOLMES.
AUTOMOBILE.
APPLICATION FILED AUG. 22, 1904.
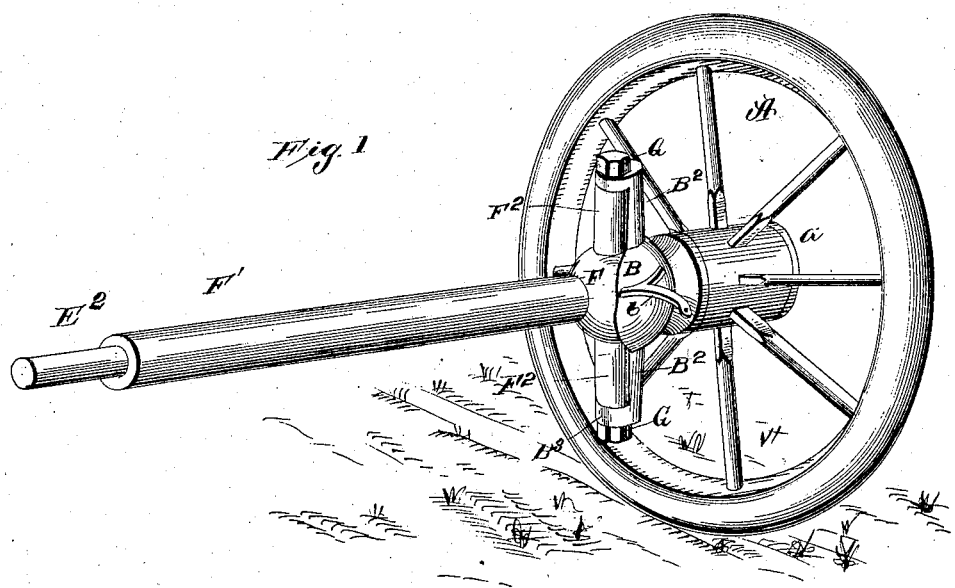
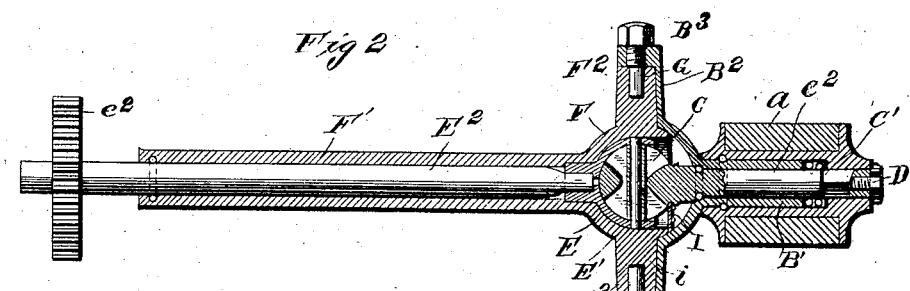
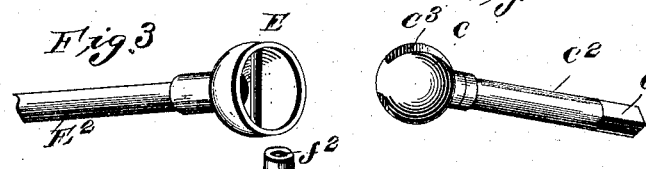
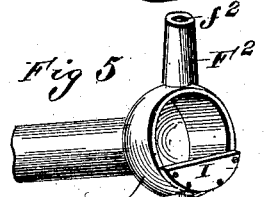
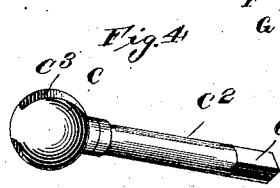
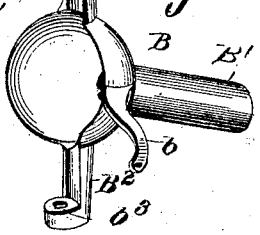
WITNESSES:
C. Edw. Duffey
Perry B. Turpin
INVENTORS
Arba Holmes
Albert Holmes
BY Munn & Co.
ATTORNEYS No. 780,798. Patented January 24, 1905.

UNITED STATES PATENT OFFICE.

ARBA HOLMES AND ALBERT HOLMES, OF CARROLL, IOWA.

AUTOMOBILE.

SPECIFICATION forming part of Letters Patent No. 780,798, dated January 24, 1905.

Application filed August 22, 1904. Serial No. 221,721.

*To all whom it may concern:*

Be it known that we, ARBA HOLMES and ALBERT HOLMES, citizens of the United States, residing at Carroll, in the county of Carroll and State of Iowa, have made certain new and useful Improvements in Automobiles, of which the following is a specification.

Our invention is an improvement in knuckle-joint constructions for use in automobiles and elsewhere where such joints may be desired; and the invention consists in certain novel constructions and combinations of parts, as will be hereinafter described and claimed.

In the drawings, Figure 1 is a perspective view of our invention as in use. Fig. 2 is a vertical longitudinal section thereof. Fig. 3 is a detail perspective view of the socket-section, and Fig. 4 is a similar view of the ball-section of the ball-and-socket joint. Fig. 5 is a detail perspective view of a portion of the main casing-section, and Fig. 6 is a detail perspective view of the end casing-section.

In the accompanying drawings we have illustrated our invention in connection with one of the drive-wheels A of an automobile, the hub $a$ being journaled on the sleeve B' of the end casing-section B and being fixed at C' to the outer squared end of the shaft $C^2$ of the ball C by fitting a squared opening in the outer end of the hub $a$ on the squared end C' of the shaft $C^2$ and securing it by the head of a screw D, as shown in Fig. 2 of the drawings. The ball C fits within the socket E and is slotted at $C^3$ for the passage of the pin E', which may be covered or jacketed from end to end by a sleeve, as best shown in Fig. 2 of the drawings, to relieve friction in the operation of the ball-and-socket joint. The socket E has fixed to it the drive-shaft $E^2$, which may be turned by any suitable gearing with the pinion $e^2$ or in any other suitable manner, and this shaft $E^2$ operates within the sleeve F' of the main casing-section F.

The section F, together with the section B, incloses the ball-and-socket joint, and these sections F and B are pivoted together on opposite sides of the ball-and-socket joint, preferably by the construction shown and which includes the opposite radially-projecting arms $F^2$ on the casing F, socketed in their outer ends to receive the pivot-pins G, which latter are secured to the outer ends of the arms $B^2$ of the casing B. The radially-projecting arms $F^2$ of the section F are rounded in cross-section, and the arms $B^2$ of the casing B are provided in their inner faces with rounded grooves or recesses in which fit the rounded arms $F^2$, forming a tight joint and presenting a neat and attractive appearance, as will be understood from Figs. 1 and 2 of the drawings, outer ends of the arms being deflected at $B^3$ to lap upon the outer ends of the arms $F^2$ of the casing F, and are provided with threaded openings $b^3$, in which are threaded the screws G, the said screws being extended beyond the threaded portion and having smooth unthreaded portions at their inner ends turning in the sockets $f^2$ on the outer ends of the arms $F^2$ of the main casing-section. By this construction the ball-and-socket joint is incased and protected from dust and moisture.

An oil-cup is formed within the main casing-section to receive the lower portion of the ball-and-socket joint, so the latter may run in oil placed in the cup. This cup is preferably secured by means of a plate I, secured to the outer end of the casing-section F, as best shown in Figs. 2 and 5 of the drawings.

In Fig. 2 I show the pin of the ball-and-socket joint as provided with a jacket in the form of a straight sleeve extending the full length of the pin.

As shown in Figs. 1 and 6, the end casing-section is provided with a crank-arm $b$, to which may be connected the rod for operation from the steering devices for the purpose of shifting the wheel A in the operation of steering.

Having thus described our invention, what we claim as new, and desire to secure by Letters Patent, is—

1. The combination of the ball-and-socket joint, the shafts projecting from the sections thereof, the casing-sections, the radially-projecting arms on one of said sections, the said arms being rounded in cross-section, the radially-projecting arms on the other section grooved in their inner ends to receive the rounded arms of the first section, and provided at their outer ends with laterally-deflected portions lapping against the ends of the arms of the first section, and pivot-points carried by the said deflected portions and projecting into the ends of the arms of the first section, substantially as set forth.

2. The combination of the ball-and-socket joint, the casing-sections inclosing the said joint and fitting one within the other, the inner casing-section provided at its inner end at its lower side with an upwardly-projecting plate forming an oil-receptacle within said inner section, substantially as and for the purpose set forth.

ARBA HOLMES.
ALBERT HOLMES.

Witnesses:
CHAS. C. HELMER,
W. C. SAUL.